R. S. O'NEIL.
APPARATUS FOR SIGNALING AND RECORDING THE COURSE STEERED BY VESSELS.
APPLICATION FILED JUNE 8, 1915.
1,330,898.
Patented Feb. 17, 1920.
4 SHEETS—SHEET 1.
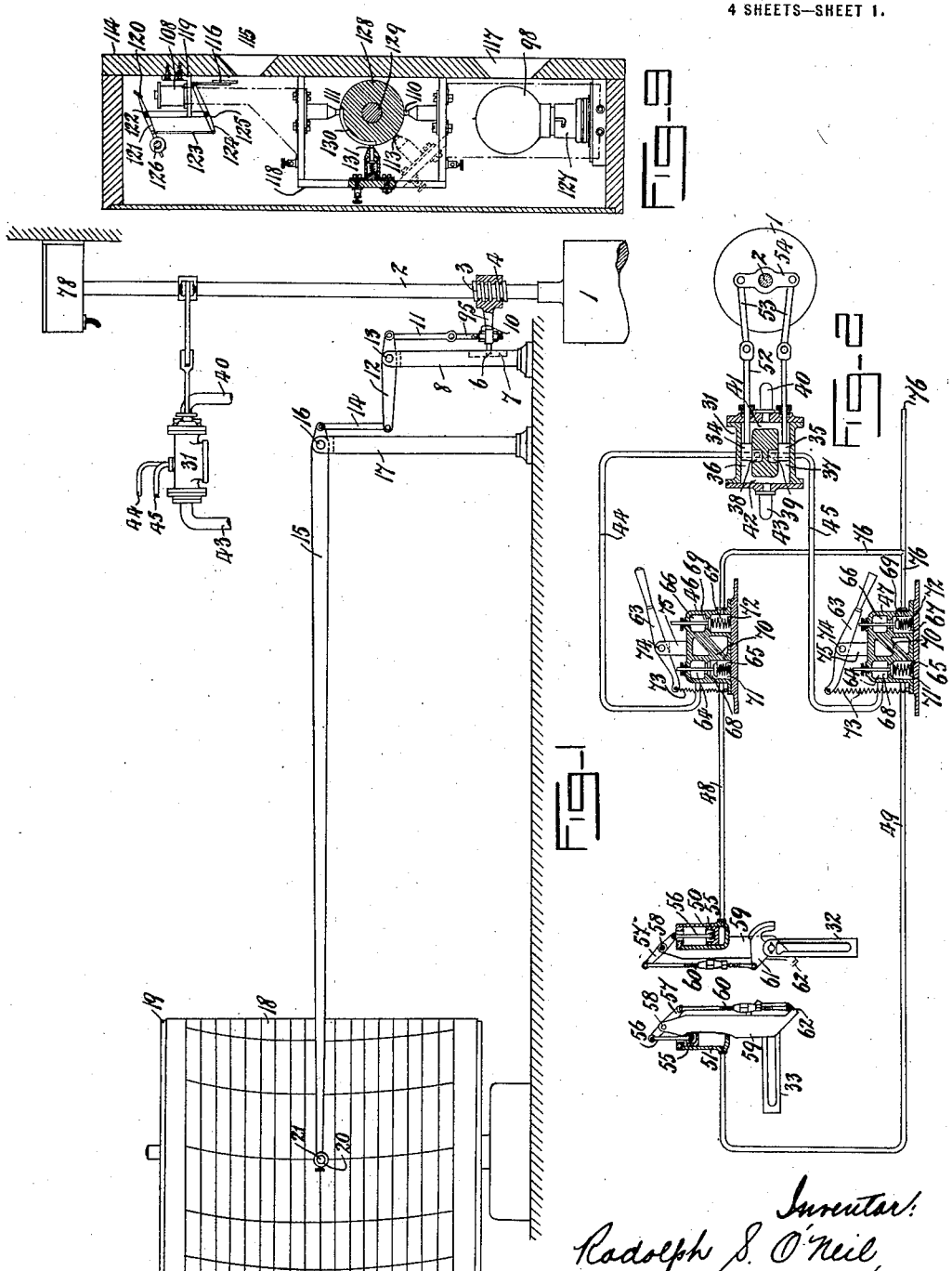

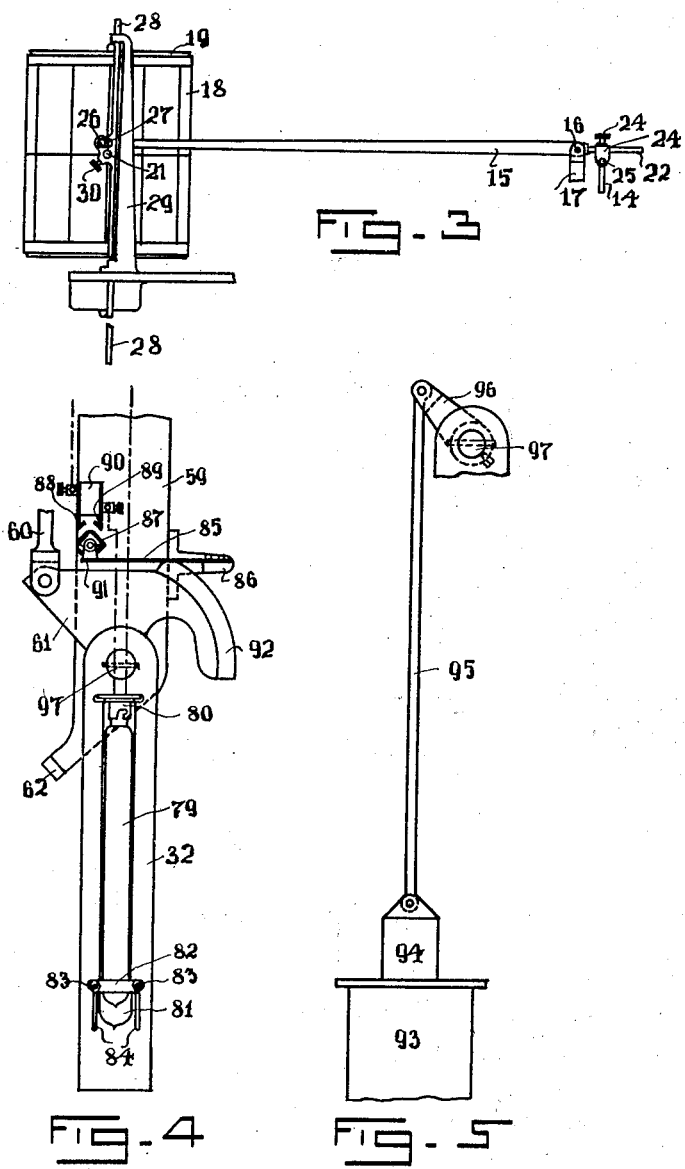

R. S. O'NEIL.
APPARATUS FOR SIGNALING AND RECORDING THE COURSE STEERED BY VESSELS.
APPLICATION FILED JUNE 8, 1915.
1,330,898.
Patented Feb. 17, 1920.
4 SHEETS—SHEET 3.
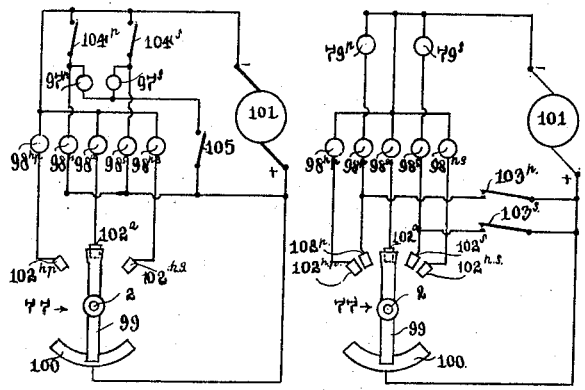
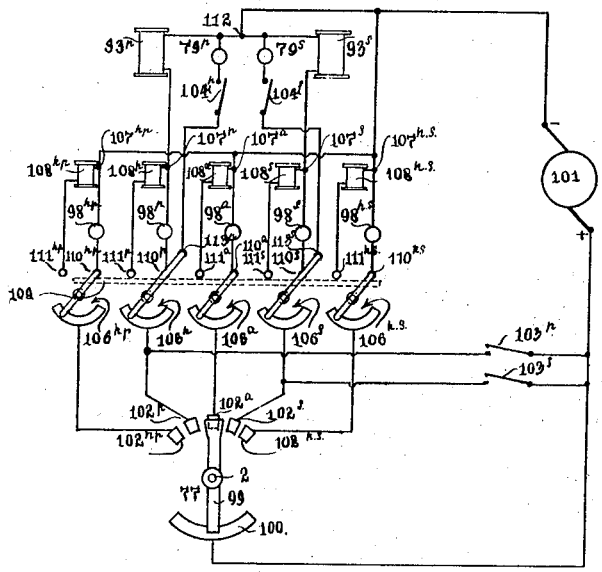

R. S. O'NEIL.
APPARATUS FOR SIGNALING AND RECORDING THE COURSE STEERED BY VESSELS.
APPLICATION FILED JUNE 8, 1915.
1,330,898.
Patented Feb. 17, 1920.
4 SHEETS—SHEET 4.
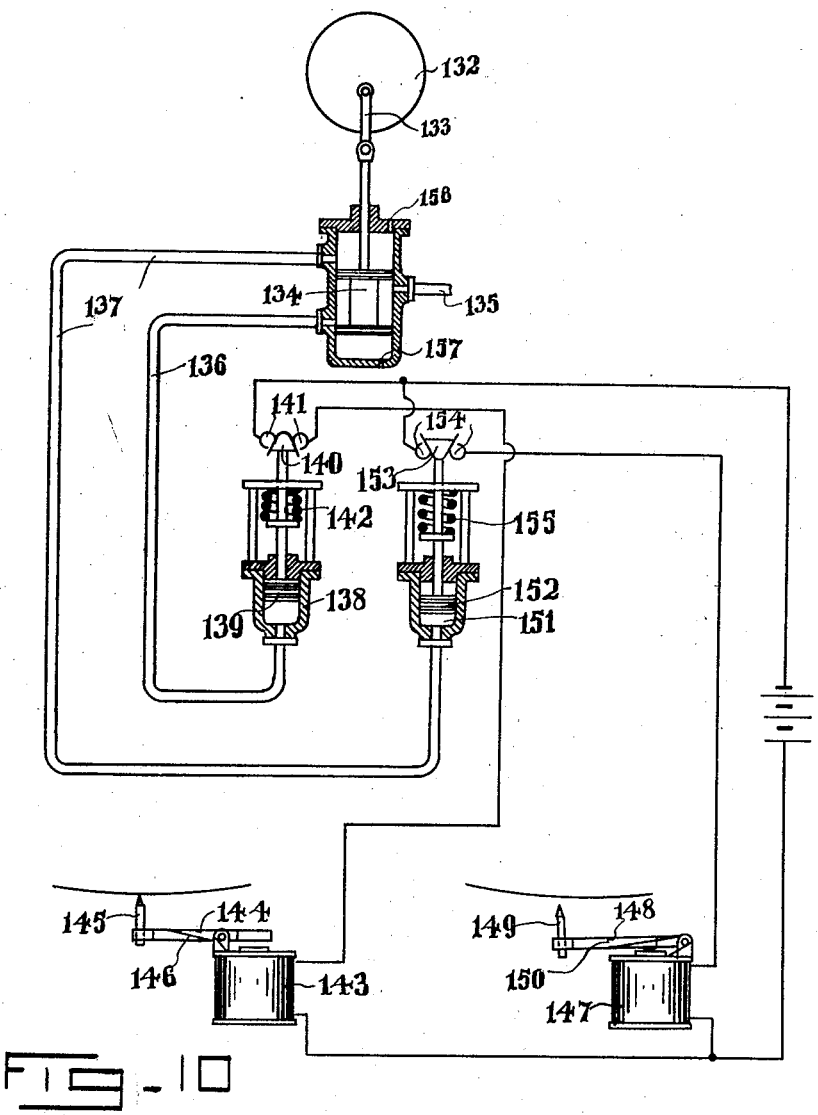
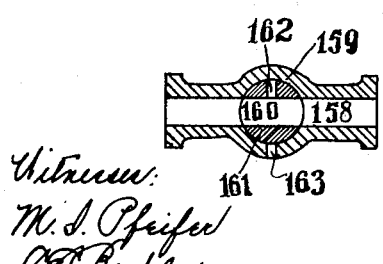

UNITED STATES PATENT OFFICE.

RODOLPH STUART O'NEIL, OF LONDON, ENGLAND.

APPARATUS FOR SIGNALING AND RECORDING THE COURSE STEERED BY VESSELS.

1,330,898. Specification of Letters Patent. Patented Feb. 17, 1920.

Application filed June 8, 1915. Serial No. 32,976.

*To all whom it may concern:*

Be it known that I, RODOLPH STUART O'NEIL, a subject of the King of Great Britain, and resident of London, England, have invented certain new and useful Improvements in Apparatus for Signaling and Recording the Course Steered by Vessels, of which the following is a specification.

This invention relates to an improved apparatus for signaling and recording the course steered by a vessel, and has reference to apparatus wherein the operation of the steering mechanism is utilized to automatically signal the course being steered.

The only prior propositions of this character with which I am acquainted consisted of signaling arrangements coupled to the steering wheel or steering mechanism by means of links or chains and ropes. The vital distinction between these prior arrangements and my invention is that it is an essential characteristic of my invention that the operation of the semaphores and recording stylus is controlled directly from the rudder post.

Owing to backlash in the steering mechanism and other possible causes the steering wheel is often out of correct register with the rudder and the position of the steering wheel is no indication of the true position of the rudder. How important this is will be readily appreciated when it is remembered that it is possible for steering gears to become temporarily disorganized and many collisions have doubtless occurred by reason of a helmsman signaling by gongs his intention to steer in one direction and owing to a defect in the steering gear failing to do so.

In my apparatus failures upon the part of the steering apparatus or the helmsman are quite immaterial since what is signaled and recorded in my case is the movement of the rudder however that movement is caused. A further feature of my invention consists in providing means for automatically signaling these rudder positions in the wheel house bridge or other positions as well as at the mast head so that failures of the helmsman or the steering gear will be at once detected and the position of the rudder, whether the intended position or not, will be at once apparent. Another feature consists in providing means whereby the signals will be equally effective both by day and by night. In the case of the mast head semaphores this may be conveniently effected by providing semaphore arms with devices by which they become illuminated in their display position and it should be here noted that no broad claim is made by me to semaphores of this character since it is within my knowledge that such devices have been provided in hand operated signaling systems. In the case of the wheel house the various indications may be effected in the day time by means of electrically controlled disks and at night by electric lamps. Here again it should be noted that automatically signaling rudder movements by means of lamps is not new *per se* and is only claimed by me in combination with the other essential characteristics of my invention and as part of my general signaling system. A still further feature of my invention which should be specifically mentioned is the recording apparatus associated directly with the rudder movement which will give a graphic record of the rudder movements and as a consequence a record of the exact course steered by the vessel. This recording mechanism is also so arranged as to record the direction of running of the ship's engines or to indicate that the engines were stopped.

In accordance with a practical embodiment of my invention, I provide semaphore arms carried by the mast head and these semaphore arms carry electric lamps preferably in the form of tubes extending substantially the length of the semaphore arms. In direct connection with the rudder post I provide mechanism which, as the rudder moves to port or starboard operates to raise a corresponding semaphore arm and when desired to light the lamp therein.

Means are also provided as aforesaid for indicating in the wheel house or in any other convenient situation, what course the ship is taking and these means conveniently take the form of electro-mechanical indicators by day and electric lamps by night. Suitable change-over switches are provided for bringing either the electro-mechanical indicator or the lamps into operation.

Means are also provided for enabling the signaling apparatus to be operated manually and independently of the rudder if desired.

The semaphores may be actuated by fluid pressure or by electrical means. In the former case an automatic fluid pressure control valve is associated with the rudder post, and admits fluid pressure to one of two semaphore operating cylinders as the rudder moves. In the latter case the said rudder post is furnished with a switch operating to close circuit through one of two semaphore operating solenoids or their equivalent.

In order that my invention may be readily understood and carried into practice, reference is made to the accompanying drawings wherein:

Figure 1 is a diagrammatic view showing the connection of the rudder post to the recording and semaphore controlling devices. In this example an automatic fluid pressure valve is illustrated.

Fig. 2 is another diagrammatic view showing the rudder post in plan and the fluid pressure valves in sectional plan the means employed for operating the semaphores by fluid pressure being also clearly shown.

Fig. 3 illustrates a modification in the recording device.

Fig. 4 is a view to an enlarged scale and shows the arrangement of a lamp in a semaphore and means for lighting the lamp when the said semaphore is raised.

Fig. 5 shows how the semaphore arms may be operated by electrical means.

Fig. 6 is an electrical diagram showing the electrical connections to the indicating lamps in the arrangement wherein the raising of a semaphore is effected by means of fluid pressure devices.

Fig. 7 is a view similar to Fig. 6 but illustrates a modified arrangement.

Fig. 8 is an electrical diagram illustrating the operation of the semaphores by electrical means and embodying the indicating device shown in Fig. 9.

Fig. 9 is a cross sectional view of an indicating device adapted to give visible indications in the wheel house or other situation.

Fig. 10 is a diagrammatic view illustrating the arrangement for insuring a record of the condition of running of the ship's engines, and Fig. 11 is a view of a minor detail for use with a modification of this arrangement.

Referring to these drawings, and particularly to Figs. 1 and 2 thereof, the numeral 1 designates the rudder post which carries the spindle 2 from which all the recording and controlling mechanism is operated.

Dealing first with the recording device. This is operated by a screw 3 upon the spindle 2, upon which screw the nut 4 is caused to travel by reason of the rotary motion of the rudder post 1. The nut 4 is furnished with an arm 5, the end 6 of which engages a slot 7 in the standard 8 thereby preventing the nut from rotating with the spindle 2 and constraining it to move only in a vertical direction. To this arm 5 is attached a rod 9 adjustable for height by means of nuts 10 or by equivalent means. A link 11 connects the upper end of this adjustable rod to one end of the lever 12 which is pivoted at 13 to the standard 8. The other end of this lever 12 is coupled by a link 14 to one end of a lever 15 which is pivoted at 16 to the standard 17 and whose other end travels over a chart 18 on the recording drum 19 and is provided with a clamp 20 adapted to carry a pencil 21 or other instrument whereby the movements of the lever may be recorded on the chart. It will be understood that this arrangement of levers constitutes a multiplying gear whereby the slight vertical movement of the nut 4 is translated into a motion of sufficient amplitude to be clearly recorded on the chart 18. The chart is graduated vertically in degrees and horizontally in time units and the drum on which it is rotated revolves at a uniform rate and in a fixed period of time so that the position of the rudder at any particular time is clearly recorded by the pencil 21.

Fig. 3 shows a modification of the recording device and provides for a straight line motion of the pencil over the chart in a vertical direction. In this arrangement the recording lever 15 is as before pivoted at 16 to the standard 17. Its short arm takes the form of a rod 22 upon which an adjustable clamp 23 is fixed by a set screw 24. To this clamp 23 the link 14 is pivoted at 25. By means of this clamp the amplitude of swing of the lever 15 may be adjusted to the chart. The long arm of the lever 15 is provided with a pin 26 which engages a slot 27 in the vertically slidable bar 28. This bar slides in suitable guides in the fixed bracket 29 and is provided with a clamping screw 30 for holding the pencil or equivalent 21. By this device the swinging motion of the lever 15 is converted into a straight line motion for the pencil and the chart 18 is graduated accordingly.

If a long record be desired, two chart rollers may be employed and the chart rolled off one and on to the other, allowance being made in the chart for the varying diameter of the rollers.

The differential fluid pressure valve 31 is also operated from the spindle 2, and its function is to raise either of the semaphores 32 and 33 to the "on" position—but not both together—or to permit both to fall to the "off" when the vessel is making a straight course.

The differential valve comprises two valve pistons 34, 35 working in cylinders 36, 37 respectively and operating alternately to open or close the ports 38, 39 in communication therewith, the port 38 being opened as the port 39 is closed and vice versa. Steam, compressed air, or other suitable fluid under pressure is supplied through the pipe 40 to the pressure chest 41 which is common to both cylinders while the exhaust escapes by way of the common exhaust chest 42 and exhaust pipe 43. Pipes 44 and 45 communicating with the ports 38, 39 lead respectively to the hand valves 46, 47 which are connected by pipes 48, 49 to the operating cylinders 50, 51 of the semaphores 32, 33. The valve pistons 34, 35 are furnished with piston rods 52 which are coupled by connecting rods 53 to opposite extremities of the rocking-lever 54 mounted on the spindle 2. By this means the valve pistons are constrained whenever the rudder moves to travel in opposite directions, thereby tending to open one of the ports 38, 39 to the pressure chest and close it to the exhaust while the other port is closed to the pressure chest and open to the exhaust. In practice a negative lap is given to the valve pistons as shown in Fig. 2, so that in the normal or "straight ahead" position both ports 38, 39 are in communication with the exhaust chest.

Neglecting, for the moment, the presence of the hand-operated valves 46, 47,—which function independently of the differential valve 31,—consider the rudder post 1 and with it the spindle 2 to be moved to starboard. By reason of the motion of the rocking lever 54 the starboard valve piston 34 will be caused to travel to the left Fig. 2, thereby first closing the port 38 to the exhaust chest 42 and then opening it to the pressure chest 41, while the port valve piston 35 will merely further uncover the port 39 to the exhaust. Under these circumstances the starboard semaphore 32 is at once raised to the "on" position, where it remains until the rudder again returns to the normal position, when the fluid contained in the operating cylinder 50 is free to exhaust and let the semaphore drop.

The semaphore operating mechanism is arranged as follows:—Each of the operating cylinders 50, 51 has a trunk piston 55 which is coupled by a connecting rod 56 to one end of the rocking lever 57 pivoted at 58 to the frame plate 59 which is attached in any convenient manner to the ship's mast or in any other convenient situation. An adjustable link 60 couples the other end of the rocking lever 57 to a suitably corresponding point on the semaphore counterbalance weight 61. A stop 62 on the frame plate lies in the path of the counterbalance weight 61 and so limits the upward travel of the semaphore. The manually operable valves 46, 47 are normally inoperative, the fluid passing freely through them, but may be used by the steersman for signaling purposes when he is about to change the ship's course. When it is desired to raise a semaphore independently of the rudder movement the corresponding valve is operated by means of handlever 63 to close the passage to the differential valve 31 and make communication with the source of fluid pressure supply.

Each hand valve comprises four chambers, 64, 65, 66 and 67 arranged in pairs. The chambers 64 and 65 are arranged one above the other and communication between them is established by opening the valve 68. The chambers 66 and 67 are placed in similar relation and communicate with each other by way of the valve 69. Chambers 65 and 66 are connected by the duct 70. Springs 71 and 72 respectively tend normally to keep the valves 68 and 69 upon their seats, but the valve 68 is normally held open—against the influence of its spring 71—by the hand lever 63 which by reason of the spring 73 tends to take up the position shown in the case of the hand valve 46. In this position there is a clear passage from the differential valve 31 through the pipe 44 and valve 68 to the pipe 48 and operating cylinder 50. The hand lever 63 is pivoted at 74 to a suitable bracket 75 or the like so as to be capable of operating either of the valves 68, 69 alternately.

The hand valve 47 is shown with the hand lever depressed in opposition to the spring 73 in which position it permits the valve 68 to close thereby cutting off communication between the cylinder 51 and the pipe 45 while the valve 69 is opened. The pipe 76 connects the chamber 67 to the source of fluid pressure supply and when the valve 69 is opened the fluid passes into the chamber 66 and thence by the duct 70 to the chamber 65 whence it proceeds by way of the pipe 49 to the cylinder 51 and there operates to raise the semaphore arm 33 which is illustrated in the raised position. It will be observed that as soon as the hand lever 63 is permitted to return to its normal position it will open the valve 68 and permit the valve 69 to close. The cylinder 51 will then exhaust by way of pipe 49, through open valve 68, pipe 45, exhaust chest 42 and exhaust pipe 43.

In addition to operating the recording mechanism and the differential valve aforesaid the spindle 2 also controls multiple way switch 77 whose function is successively to light and to extinguish the several electric lamps whereby the rudder movements are indicated. This switch may be housed in any suitable form of casing 78 fixed on a bulk head or in any other convenient situation and may conveniently be located upon the upper end of the spindle 2. The arrangement of this switch will hereinafter be fully described in relation to the electrical diagrams Figs. 6, 7 and 8.

In some cases the semaphore arms may themselves when raised complete the circuits for their associated signal lamps and such an arrangement is illustrated in Fig. 4. Tubular lamps 79—preferably colored to distinguish port from starboard—are fitted in holders 80 so arranged that the lamps lie snugly within the slots and cavities 81 in the semaphore arms. Each lamp is held in position by suitably disposed clamping plates 82, one on either side of the arm and connected by bolts 83. In the arrangement shown long slots 84 are provided in the semaphore arm and through these slots the bolts 83 pass. With this arrangement the clamp fitting can when the bolts are slackened be slid along bodily so as to permit withdrawal of the lamp 79. This obviates the necessity for completely removing the clamp when renewing the lamp.

A resilient leaf 85 is anchored to an insulating block 86 fixed upon the frame plate 59 and carries at its free end the switch knife 87 which is adapted to connect the two switch poles 88 and 89 when the said leaf is raised. The two switch poles 88 and 89 are mounted in an insulating block 90 and the knife 87 is pivoted at 91 so that it can seat snugly between the prongs 88, 89 and make good electrical contact. The resilient leaf 85 is raised by a cam 92 of insulating material mounted on the counterbalance weight 61 in such a position that it deflects the leaf as soon as the semaphore is raised. The electrical circuit through this switch to the signal lamp is illustrated in Fig. 4 by chain lines. Either flexible connections or slip rings may be employed to convey current from the fixed to the moving members.

Fig. 5 illustrates a method of operating the semaphores electrically. A solenoid 93 has an armature 94 which is coupled by a link 95 to a crank 96 fast upon the spindle 97 of the semaphore arm. It will be seen, that when the solenoid is energized its armature is drawn downward and the semaphore arm raised accordingly. The arm is of course provided with counterbalance weight, lamp and if desired with switch mechanism as in the previous example.

In the ship's wheelhouse five signal lamps all designated by the numeral 98 are employed and are arranged as shown diagrammatically in Fig. 6. These lamps and all the associated and corresponding members will hereinafter be collectively referred to by numeral alone and individually distinguished by that numeral together with an appropriate index letter. A centrally disposed white lamp 98a is alight so long as the ship keeps a straight course. When however the rudder is moved to port a red lamp 98p is lighted while if it be moved to starboard a green lamp 98s is lighted and in either case the central white light 98a is extinguished. If the rudder be moved hard-a-port a white lamp 98hp is lighted in addition to the red lamp 98p while if it be moved hard-a-starboard a white lamp 98hs will be lighted in addition to the green lamp 98s. The semaphore signal lamps 79p and 79s are respectively connected either in series or in parallel with the wheelhouse lamps 98p and 98s.

A simple arrangement of the electrical circuits is shown in Fig. 6 and in this case the semaphore arms do not operate to close the signal lamp circuits which normally are controlled entirely from the rudder switch 77. This comprises a switch arm 99 carried by and turning with the spindle 2. One end of this arm bears upon a segmental plate 100 connected to one terminal of the source of electrical supply 101 and the other travels over a series of five contacts 102. It rests upon the contact 102a, when the ship is traveling straight ahead and closes circuit through the white lamp 98a. When, however, the rudder is turned to port or starboard the arm 99 passes over on to the contact 102p or 102s accordingly and lights the red wheelhouse lamp 98p and the red semaphore lamp 79p in series with it or the green wheelhouse lamp 98s and the green semaphore lamp 79s in series with it, as the case may be. Sufficient insulating gap is left between these port and starboard contacts and the contact 102a to insure the lamp 98a being extinguished immediately the port or starboard lamps are lighted. Outside the contacts 102p and 102s lie the contacts 102hp and 102hs respectively and through one or other of these circuit is made for one of the white lamps 98hp and 98hs whenever the rudder is moved hard over. These contacts are placed so close to the contacts 102p and 102s respectively that the switch arm 99 bridges two contacts and makes electrical connection with both at once so that when the rudder is hard-aport a red and a white light are exhibited and when a hard-a-starboard a green and a white light appear.

Two tapping keys 103p and 103s are shown in Figs. 6 and 8. When operated they make circuit respectively through the port and starboard lamps, independently of the rudder switch 77 and are utilized by the steersman for signaling, prior to changing the vessel's course. They may be if desirable coupled with the manually operated fluid pressure valves 46 and 47 so that operation of one of the hand levers 63 not only raises the semaphore arm but also lights the lamp therein. Of course this coupling need only be employed at times when unlighted semaphore arms would not be visible.

In the arrangement shown in Fig. 7 the port and starboard lamps are put in circuit by the semaphore in the manner illustrated in Fig. 4. The semaphore switches by which the circuits of these lamps are closed are indicated by the numeral 104 in Fig. 7 and obviate the necessity for contacts 102p and 102s on the rudder switch 77. The port and starboard lights are connected in parallel in such a manner that the switch 104p is adapted simultaneously to make circuit through the wheelhouse lamp 98p and through the semaphore lamp 79p while the switch 104s is adapted simultaneously to make circuit through the wheelhouse lamp 98s and through the semaphore lamp 79s. A switch 105, however, permits the semaphore lamps to be cut out when not required. If however it be not desired to provide for switching off the semaphore lamps they may simply be respectively connected in series with their corresponding wheelhouse lamps and with the switches 104. The "hard over" lamps are as in Fig. 6 controlled by the rudder switch.

Fig. 8 shows the electrical circuits employed when the semaphores are operated electrically and also the application of an indicating device which is further illustrated in Fig. 9. This indicator is located in the wheelhouse or other suitable situation, and is adapted to exhibit either colored lamps as in the foregoing examples or colored disks, a multiple switch 106 being provided for changing over from one form of indicator to the other.

As before, the numeral 98 designates the wheelhouse lamps and the numeral 79 the semaphore lamps. To each of the return lines from the lamps 98 is connected at 107 one terminal of the disk operating magnet 108 associated with that lamp. The multiple switch 106, is for the purpose of clear illustration, depicted as a set of linked two-way switches adapted by one operation of the coupling link 109 to connect all the lamps 98 or all the magnets 108 to their respective contacts on the rudder switch 77. The lamps are all connected to contacts 110 and the magnets to contacts 111. From the points 107p and 107s respectively, parallel circuits proceed through the semaphore operating solenoids 93p and 93s and unite again at the point 112 where they join the return of the source of electrical supply 101. It will be seen from the diagram that irrespective of whether the lamps or the disks are in use in the indicators the semaphore solenoids 93 will be energized from the rudder switch 77 whenever its arm 99 comes over the port or starboard contacts. The semaphore lamps 79p and 79s, however, are on separate circuits from the rest of the indicating devices and have each a separate contact 113p and 113s on the multiple switch 106. When the latter is thrown over to bring the wheelhouse lamps into action, the switches 106p and 113s connect the two semaphore lamps each in parallel with its corresponding wheelhouse lamp, as shown in the diagram but when the disk magnets are in use, the semaphore lamps are cut out. Switches 104 actuated by the semaphores in the manner above described are included in the semaphores lamp circuits and tapping keys 103 for signaling, are connected to the port and starboard circuits as shown. These keys operate firstly to raise the semaphores and secondly, either to light the lamps or to operate the disks, according to the position of the multiple switch 106.

A convenient construction for the indicator is shown in Fig. 9. A casing 114 is provided with an upper row of orifices 115 through which the disks 116 may be exhibited and a lower row 117 through which the lamps 98 are visible, the multiple switch 106 being housed in an inner casing 118 centrally and longitudinally disposed in the casing 114 between the rows of lamps and disks.

Each of the magnets 108 is supported on a suitable bracket 119 fixed to the wall of the casing 114 and is furnished with an armature 120 carried on one arm of a lever 121 pivoted at 122. The other arm of this lever is connected by a link 123 to one end of a second lever 124 pivoted at 125 and carrying, freely suspended from its other end, the disk 116. An adjustable counterbalance weight 126 tends normally to keep the several members in the positions shown, so that the disk is not visible through the orifice 115 unless the magnet 108 be energized. The lamps 98 are carried in holders 127 of any suitable pattern.

The multiple switch 106 preferably comprises an insulating drum 128 keyed upon a rotatable spindle 129 journaled in the walls of the casing. This drum is provided with a set of segmental metallic contact plates 130 upon which the spring contacts 110, 111 and 131 are adapted to press. The contacts 131 are each connected to line through their respective contacts on the rudder switch 77, the contacts 110 and 111 are connected with the lamps 98 and the magnets 108 respectively, as indicated by chain lines in Fig. 9. By rotating the drum 128 through a right angle the connections are changed over from lamps to magnets or vice versa. As in the case of the coupling link 109 referred to in relation to Fig. 8, so in the case of the drum 128, five individual switches 106 are simultaneously operated by it. Two of these switches 106p and 106s may be furnished with the additional spring contacts 113 for the purposes hereinbefore described, and these contacts are illustrated by dotted lines in Fig. 9.

Referring to Figs. 10 and 11 the numeral 132 designates the "weigh" shaft of the engine which is of course operated to control the direction of running of the engines. By means of a link 133 this weigh shaft is connected to the plunger 134 of a valve the casing of which is connected by the pipe 135 with the casing of the intermediate cylinder of a triple expansion engine or the low pressure cylinder of a compound engine. The essential features of the invention will be best understood from a description of the operation of the invention which is as follows: When the engines are started the direction of running is, as aforesaid, controlled in the usual way by the weigh shaft 132 and according to the direction in which this is turned the plunger 134, is either raised or lowered and steam from the casing of the intermediate cylinder flows through the pipe 135 to one or other of the pipes 136 and 137.

If the engines are set to run astern the steam flows through the pipe 136 to the cylinder 138 causing the piston 139 to rise and an electrical circuit is completed through the contacts 140 and 141 against the influence of the spring 142. The electro-magnet 143 in the electrical circuit is energized and attracts its pivoted armature 144 with the result that the pencil or equivalent 145 is caused to make contact with the chart against the influence of the spring 146. This position is shown in the drawings. Now a second magnet 147 is preferably provided in a circuit in parallel with the circuit containing the magnet 143 and this magnet has a pivoted armature 148 upon one end of which a pencil 149 or equivalent is carried. This pencil is normally kept in contact with the chart by a spring indicated at 150, and the arrangement is such that this pencil is always in contact while the engines are running "ahead." That is to say when the engines are running "ahead" steam from the engine casing flows to the cylinder 151 causing the piston 152 to rise and break the circuit by separating the contacts 153 and 154. If however the engines are stopped or run "astern" the spring 155 causes the contacts 153 and 154 to come together and complete a circuit through the magnet 147 and this magnet being thus energized attracts the armature 148, and the "ahead" pencil is thus moved out of contact with the chart. The chart therefore has recorded upon it whether the engines are going either "ahead" or "astern" and if the engines are not running this will be negatively indicated by the fact that neither the "ahead" nor "astern" pencils will be in contact with the chart but the pencil recording the movements of the rudder will still be making its record.

When the plunger 134 is moving from one position to another or in mid position any steam above or below it will exhaust from the ends of the cylinder through the vents 156 and 157 provided for this purpose. If it is only desired to indicate upon the chart the fact that the engines are going astern and no indication is required of when the engines were running "ahead" or were stationary, it will only be necessary to provide the "astern" magnet and the weigh shaft will then be coupled to a valve such as is indicated in Fig. 11. This valve would, of course, replace the valve 134. When the engines are set to go "astern" the valve would be turned to the position shown in Fig. 11 and steam from the engine casing would flow through the bore 158 of the casing 159 and the bore 160 of the barrel 161 to cause the completing of the circuit through the "astern" magnet. When the engines are however set to run "ahead" the operation of the weigh shaft would cause the barrel 161 of the valve to be turned so that the passage from the engine casing would be closed. The barrel 161 is provided with a radial bore 162 communicating with the bore 160 and the valve casing 159 has a radial bore 163. When the barrel is turned to shut off steam from the engine casing the astern contact or cylinder is free by exhaust to atmosphere by way of the bore 158, bore 162, bore 160 and bore 163. It will be understood that although the arrangement shown in Figs. 10 and 11 is described particularly in relation to the recording device hereinbefore described, it can be applied to any device where the movements of a ship's rudder are recorded upon a chart.

What I claim and desire to secure by Letters Patent is:—

1. In apparatus for recording and signaling the course steered by a ship, a chart, means for moving said chart at a predetermined speed, semaphore signal arms, lamps associated with the semaphore arms and adapted to become illuminated automatically when said semaphore arms are raised, a marker associated with the chart and means carried by the rudder post for transmitting the movements of the rudder to the semaphore arms and the marker whereby the movements of the rudder are signaled by the semaphore arms and lamps and recorded upon the chart.

2. In apparatus for recording and signaling the course steered by a ship, a chart, means for moving said chart at a predetermined speed, semaphores, means controlled directly by the rudder post movement for operating said semaphores, means whereby said semaphores can be manually operated independently of the rudder movement, semaphore signal arms, a marker associated with the chart and means carried by the rudder post for transmitting the movements of the rudder to the semaphore arms and the marker whereby the movements of the rudder are signaled by the semaphore arms and recorded upon the chart.

3. Apparatus for signaling and recording the course steered by a ship comprising semaphores, electric lamps associated with said semaphores, means whereby the raising of said semaphores complete circuit to illuminate said lamps, means controlled by the rudder movement for operating said semaphores, a chart, moving at a definite speed, a marker coöperating with said chart, means controlled by the rudder movement for moving said marker to record the rudder movements upon said chart substantially as specified.

4. In apparatus for recording and signaling the course steered by a ship, semaphores, means controlled by a rudder for operating said semaphores, a uniformly moving record sheet, a marker coöperating with said chart, means controlled by the steering mechanism for moving said marker, a series of direction indicating lights, a series of electrically operated signals, and means controlled by the rudder for directing the current through said signals and lights independently.

5. In apparatus for recording and signaling the course steered by a ship, semaphores, means for operating the semaphores, a chart, a marker in coöperation therewith, means controlled by a rudder for moving said marker, a series of direction indicating lights and electrically operated signals, means carried by the rudder for conducting the current through said lights and signals, and means for directing the current through the lights and signals independently of the motion of the rudder.

In testimony whereof I affix my signature in presence of two witnesses.

RODOLPH STUART O'NEIL.

Witnesses:
A. P. COLLIER,
A. A. THORNTON.